Aug. 24, 1954 N. M. HUFF 2,687,275
HANDLE OPERATED LOCKING TYPE GAS VALVE
Filed Dec. 12, 1950
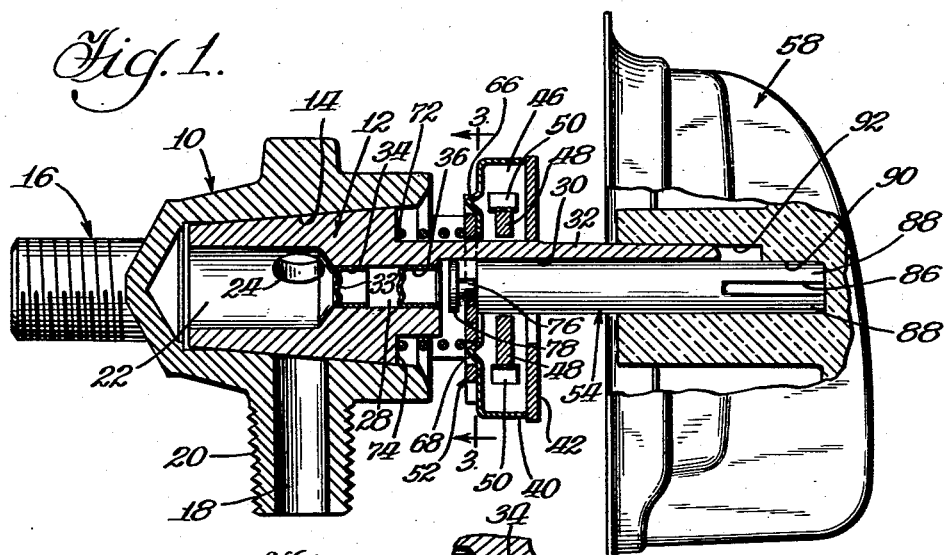
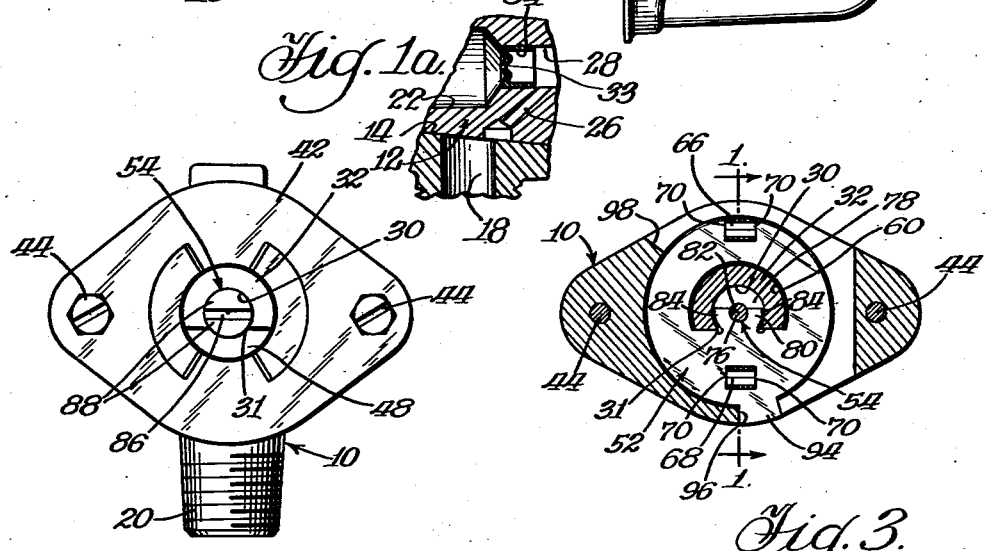
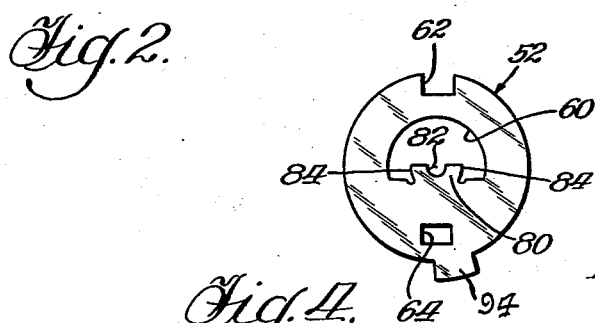
INVENTOR.
Norman M. Huff
BY Mason, Kolehmainen,
Rathburn & Wyss
Attys.

Patented Aug. 24, 1954

2,687,275

UNITED STATES PATENT OFFICE 2,687,275

HANDLE OPERATED LOCKING TYPE GAS VALVE

Norman M. Huff, Chicago, Ill., assignor to Harper-Wyman Company, Chicago, Ill., a corporation of Illinois Application December 12, 1950, Serial No. 200,400

8 Claims. (Cl. 251—96)

1

The present invention relates to gas valves and more particularly to the provision of a new and improved locking type gas valve.

Locking gas valves of various types have been developed and considerable effort has been expended in attempts to make them economically and simply, to have them operate satisfactorily over a long period of time, and to be readily operable by the user of a gas range or the like upon which they are installed. The primary object of the present invention is to provide a new and improved locking valve having these advantages.

Another object of the present invention is the provision of a new and improved locking type gas valve which is operable by axial movement of the valve handle, which can be readily grasped by the user so that the valve can be easily unlocked and then rotated to desired positions.

A further object of the present invention is to provide a new and improved locking type of valve wherein the locking mechanism includes a push rod movably mounted within an axial opening in the valve stem, the construction being especially suited for valves provided with hollow stems for other reasons, for example, as for stem adjustment means or for high-low valves including fixed orifice defining structures mounted in an axial passageway of a rotatable valve element.

A further object of the present invention is to provide a new and improved locking type valve wherein the handle is slidably mounted in a novel manner relative to the rotatable valve element.

Another object of the present invention is to provide a handle operated locking type gas valve wherein the handle is operatively connected to the movable valve element with a minimum of lost motion and having a considerable bearing area relative to a hollow stem by virtue of a double bearing construction including a first bearing area between the exterior of the valve stem and the handle and a second bearing area between the interior of the valve stem and a valve unlocking element to which the handle is fixedly but detachably secured.

A further object of the present invention is the provision of a new and improved locking type of valve including a locking plate, an axially movable push rod operatively connected to the locking plate and extending beyond the valve stem, and a handle fixedly secured to the outer end of the push rod and slidably but nonrotatably connected to the valve stem.

In brief, the valve of the present invention includes a locking plate slidably mounted relative to the valve stem and operatively associated with locking projections fixedly secured relative to the valve body, an axially movable push rod having an inner end detachably secured to the locking plate and an outer end projecting beyond the valve stem, and a handle fixedly secured to the outer end of the push rod and slidably but nonrotatably secured relative to a valve operating stem. The arrangement may be such that the valve is locked in its off position and is unlocked by moving the handle inwardly or toward the valve body, after which the valve element can then be moved to desired positions.

Other objects and advantages of the present invention will become apparent from the ensuing description of an illustrative embodiment thereof, in the course of which reference is had to the accompanying drawing, in which:

Fig. 1 is an axial cross section through a valve embodying the present invention, the valve being in its off position;

Fig. 1a is a fragmentary axial cross-sectional view through the valve and illustrating the valve in a low simmer position;

Fig. 2 is an end elevational view thereof with the handle removed;

Fig. 3 is a vertical cross-sectional view taken along the line 3—3 of Fig. 1; and Fig. 4 is a plan view of the locking plate.

The present invention is applicable to valves in general, but has been illustrated in conjunction with a double valve, which may be similar to that disclosed and claimed in the co-pending application of Charles C. Lamar, application Serial No. 709,466, filed November 13, 1946, now Patent No. 2,632,469, and include also features disclosed and claimed in the co-pending application of Charles C. Lamar, application Serial No. 86,498 filed April 9, 1949, since abandoned, and co-pending application of Philip S. Harper, application Serial No. 162,446, filed May 17, 1950. Details of the features of these other applications are not disclosed fully, but sufficiently disclosed and described herein to enable those skilled in the art to understand the construction and advantages of the present invention.

The valve includes a valve body 10 and an associated valve element which may take the form, but not necessarily so, of a rotatable plug 12 mounted in a suitable chamber 14 within the body.

The body has a pair of outlet passages, only one of which has been illustrated, it leading through an externally threaded outlet defining passageway boss 16 and a nozzle defining outlet and associated apparatus (not shown) to the main burner section of a double burner of known construction. The second outlet passageway (not shown) delivers gas to the simmer burner section. The body also has an inlet passageway 18 formed in an externally threaded boss 20.

The rotatable valve element includes an axially extending passageway 22 communicating with the second (simmer burner) outlet passageway and a plurality of other passageways of which passageway 24 is illustrated in Fig. 1, and a passageway 26 is illustrated in Fig. 1a. The arrangement of the passageways may generally be such as those disclosed and claimed in the above referred to co-pending application of Charles C. Lamar, Serial No. 709,466, to which reference may be had for a more detailed disclosure. The passageway 24, it may be stated, however, registers with the inlet passageway 18 in a certain position of the valve element, this being the full on position. The passageway 26 similarly registers with the inlet passageway in another, the low simmer position. In this position a small quantity of gas is supplied to the simmer burner section only through the passageway 26, an axially located passageway 28 forming in effect a continuation of a passageway 30 through the valve operating stem 32, which is connected to and preferably forms an integral part of the valve plug's structure. The outer portion of stem 32 is preferably, but not necessarily milled to provide it with a D-shaped configuration and also to provide it with an axially extending opening or slot 31.

A predetermined small quantity of gas determined by an orifice 33 in a cap-like closure element 34, flows from passageway 28 into passageway 22 and thence to the simmer burner section. The construction and arrangement of closure element-orifice structure is similar to that disclosed and claimed in the co-pending application of Charles C. Lamar, application Serial No. 86,498, also referred to above. The outer end of passageway 28 is closed by another cup-like but imperforate element 36 which thus separates the hollow portion 30 of the stem from the passageway 28.

The various operative positions of the valve plug may be determined and indicated in suitable manner, for example, in the manner disclosed and claimed in the above-referred-to application of Philip S. Harper. The position determining and indicating mechanism includes a top cap cup 40 and a closure element 42 connected by and secured to the valve body by the diametrically opposite securing screws 44. Within a chamber 46 defined by the cup and plate is mounted a position indicating detent plate 48 mounted on the valve stem 32 slidably and for some angular relative movement. This detent plate has associated with it a resilient plate follower element comprising the spaced arms 50 which cooperate with the plate to provide the desired position indication.

The present invention, as heretofore indicated, is directed to the provision of a new and improved locking valve and this invention will now be described in detail. In the main it includes movable locking means comprising a locking plate 52 slidably but nonrotatably mounted on the valve stem, an axially extending and movable locking means operating element 54, for convenience hereinafter referred to as a push rod, and a valve handle 58 fixedly secured to the push rod but slidably and nonrotatably mounted relative to the valve stem. The handle is thus used not only to rotate the valve element but also to unlock the valve.

The locking plate, which is best illustrated in Figs. 3 and 4, is slidably and nonrotatably mounted on the valve stem, it being provided with a generally D-shaped aperture 60 through which the correspondingly shaped valve stem 32 projects. The locking plate may be suitably constructed to lock the valve stem and valve element against movement in a desired position of the valve plug, such as in the off position. Preferably, the locking is provided by complementary recesses and projections in the plate and structure that is fixed relative to the valve body. As shown, the locking plate is provided with the substantially diametrically oppositely located locking recesses 62 and 64, arranged to cooperate with similarly spaced apart projections 66 and 68, which may take the form of integral indentations on the bottom of the top cap cup 40. These projections have substantially perpendicular end portions 70 which engage the straight sides of the slots 62 and 64 in the off position of the valve plug, thereby to prevent rotation of the plug until the locking plate is moved away from the end cap cup. The locking plate is held against the cup by a spring 72 located between the plate and a shoulder 74 formed in the valve plug, the spring serving also to hold the plug in its chamber.

The valve can be unlocked by an inward movement of the handle 58 which is operatively connected to the locking plate by the push rod 54 in a novel manner. As best illustrated in Figs. 1 and 3, the push rod is provided at its inner end with a reduced diameter neck-like portion 76, at the end of which is a head 78 spaced by the neck from the remainder of the push rod. The operative connection between the push rod and locking plate is effected through a generally U-shaped radially inwardly extending abutment 80 on the locking plate, which extends into the hollow of the stem through the slot 31 and which has a central recess 82, of dimensions corresponding generally to that of the neck, and outer arcuate portions 84 dimensioned fairly closely to fit in the hollow portion 30 of the stem. The arrangement is thus such that when the handle and push rod are pushed inwardly, the push rod moves the locking plate against the force of the spring 72 to unlock the valve. When the handle is released the locking plate, push rod, and handle are returned to their initial and normal positions by the action of spring 72.

The described operative connection between the push rod and locking plate is detachable for assembly purposes, but is substantially a fixed connection when assembled in the valve stem as indicated. In assembly, the push rod and locking plate are secured with the neck 76 in the recess 82 and the thus assembled parts are pushed into the hollow 30 from the open end of the stem. Once pushed in, the sub-assembly is movable only axially of the stem.

The valve handle is detachably but fixedly secured to the outer end of the push rod. Preferably, the outer end is slit by a cut 86 defining the bifurcations 88, which may be forced apart somewhat prior to placing of the handle thereon. The handle is provided with a circular push rod receiving opening 90 dimensioned tightly to grip the end of the push rod, but not so tightly as to prevent the handle from being removed if desired.

The handle is slidably and rotatably mounted relative to the outer end of the valve stem 32, the handle being provided with a D-shaped opening 92 adapted fairly closely to receive the end of the valve stem. The arrangement is thus such that the valve handle is actually mounted on the push rod with a double bearing construction relative to the stem and turns the valve plug through its nonrotatable relationship with the valve stem.

The locking plate 52 is utilized to determine the limits of movement of the valve plug. This is readily done by providing the plate with a relatively narrow radial extension 94 engageable with shoulders 96 and 98, preferably formed integrally with the valve body and determining the off and full on positions of the valve plug.

The valve of the present invention may be made and assembled readily. It also may be taken apart if desired in an easy and simple manner. In use, the valve is locked in off position by the cooperative action of the recesses 62 and 64 in the locking plate and the projections 66 and 68 on the top cap cup. The locking plate is held in locking position by the spring 72 which also holds the valve plug in place. To unlock the valve it is necessary only to move the valve handle 58 inwardly a short distance thereby to move the locking plate away from the recesses against the spring. During the unlocking operation the push rod 54 is moved axially inwardly and the valve handle is moved similarly relative to the stem, but not relative to the push rod. To move the valve from its off to another position after it is unlocked, the handle is turned thereby to turn the valve plug through the valve stem which is turned directly by the handle and not through the push rod. The construction is such that the handle, even though movable relative to the valve stem, is relatively rigidly connected to the latter. The construction thus avoids the looseness or wobble present in many locking type valves.

While the present invention has been described in connection with the details of an illustrative embodiment of the invention, it should be understood that these details are not intended to be illustrative of the invention except insofar as set forth in the accompanying claims.

What is claimed as new and desired to be secured by Letters Patent of the United States is:

1. A locking type gas valve including a position indicating mechanism housing having a front and a back, a hollow stem extending forwardly through the front of said housing and having an axially extending slot, a push rod axially movable in said hollow stem, said rod having a neck-like portion at its inner end and having its outer end projecting beyond the end of the stem, said inner end and neck-like portion being located back of said housing, a locking plate encircling and slidably mounted upon the hollow stem at the back of said housing and having a portion extending through said slot into the hollow of the stem, said latter portion being detachably received on said neck-like portion operatively to connect said plate and rod, said plate and housing having cooperating locking projections and recesses engageable and disengageable upon axial movement of said plate, spring means acting on said plate biasing said plate against said housing, and locking said valve when said projections are in said recesses, and a valve operating handle secured to the projecting end of said push rod and slidably but nonrotatably connected to the valve stem and slidable inwardly to move said rod and plate against said spring means to unlock said valve.

2. A locking type gas valve including a hollow stem having an axially extending slot, a push rod axially movable in said hollow stem, said rod having a neck-like portion at its inner end and its outer end projecting beyond the end of the stem, a locking plate encircling and slidably mounted upon the hollow stem and having a portion extending through said slot into the hollow of the stem, said latter portion including a portion detachably received on said neck-like portion operatively to connect said plate and rod, said locking plate and valve having locking elements engageable and disengageable upon axial movement of the plate, spring means biasing said rod and plate outwardly resiliently to hold said elements in engagement, and a valve operating handle secured to the projecting end of said push rod and slidably but nonrotatably connected to the valve stem and slidable inwardly to move said rod and plate against said spring means to disengage said locking elements.

3. A locking type gas valve including a hollow stem having an axially extending slot, a push rod axially movable in said hollow stem, said rod having a neck-like portion at its inner end and its outer end projecting beyond the end of the stem, a locking plate encircling and slidably mounted upon the hollow stem and having a portion extending through said slot into the hollow of the stem, said latter portion including a portion detachably received on said neck-like portion operatively to connect said plate and rod, said locking plate and valve having locking elements engageable and disengageable upon axial movement of the plate, and a valve operating handle secured to the projecting end of said push rod and slidably but nonrotatably connected to the valve stem, whereby said locking elements are disengageable by axial movement of said push rod.

4. A locking type gas valve including a hollow stem having an axially extending slot, a push rod axially movable in said hollow stem, a locking plate encircling and slidably mounted upon the hollow stem and having a portion extending through said slot into the hollow of the stem and connecting said plate to said push rod, said locking plate and valve having locking elements engageable and disengageable upon axial movement of the plate, and a valve operating handle secured to said push rod and slidably but nonrotatably connected to the valve stem, whereby said locking elements are disengageable by axial movement of said push rod.

5. A locking type gas valve operable by a handle having first and second recesses for receiving a valve stem and a locking plate operating element respectively, including, in combination, a hollow valve operating stem, a valve stem locking plate encircling the stem and slidably mounted relative to it, said plate and valve having engageable locking elements that are disengageable upon movement of said plate, and an axially movable locking plate operating element in the hollow stem connected to said plate and having one end projecting beyond the end of said stem, said element having a handle receiving portion at its projecting end adapted fixedly to be inserted into the second recess of the handle and said stem having a portion at its outlet end adapted slidably and nonrotatably to be inserted into the first recess in the handle.

6. A locking type gas valve operable by a handle having first and second recesses for receiving a valve stem and a locking plate operating element, respectively, including in combination, a hollow valve operating stem having an axially extending slot, a valve stem locking plate encircling the hollow stem slidably mounted relative to the stem and having a portion extending through said slot into the hollow of the stem, said plate and valve having engageable locking elements that are disengageable upon movement of said plate, and an axially movable locking plate operating element in the hollow of the stem and projecting outside the confines of said stem, said element having a neck-like portion at its inner end operatively connected to the portion of the locking plate extending into the hollow of the stem and a handle receiving portion at its outer end adapted fixedly to be inserted into the second recess in the handle, and said stem having a portion at its outer end slidably and nonrotatably to be inserted into the first recess in the handle.

7. A locking type gas valve, including in combination, a hollow valve operating stem having an axially extending slot, a valve stem locking plate encircling the hollow stem slidably mounted relative to the stem and having a portion extending into the hollow of the stem through said slot, said plate and valve having engageable locking elements that are disengageable upon axial movement of said plate, and an axially movable locking plate operating element in the hollow of the stem and projecting outside the confines of said stem, said element having a neck-like portion at its inner end operatively connected to the portion of the locking plate extending into the hollow of the stem.

8. A locking type gas valve, including in combination, a hollow valve operating stem having an axially extending slot, a valve stem locking plate encircling the hollow stem slidably mounted relative to the stem and having a portion extending into the hollow of the stem through said slot, said plate and valve having engageable locking elements that are disengageable upon axial movement of said plate, and an axially movable locking plate operating element in the hollow of the stem operatively connected to the portion of the locking plate extending into the hollow of the stem.

References Cited in the file of this patent

UNITED STATES PATENTS

| Number | Name | Date |
|---|---|---|
| 1,343,530 | Tallman | June 15, 1920 |
| 1,880,648 | Yablick | Oct. 4, 1932 |
| 1,996,164 | Meusy | Apr. 2, 1935 |
| 2,259,592 | Suvak et al. | Oct. 21, 1941 |
| 2,303,530 | Weber et al. | Nov. 24, 1942 |

FOREIGN PATENTS

| Number | Country | Date |
|---|---|---|
| 761,034 | France | 1934 |